United States Patent
Strauss et al.

(10) Patent No.: US 7,487,752 B2
(45) Date of Patent: Feb. 10, 2009

(54) CONTROL VALVE FOR A DEVICE TO MODIFY THE TIMING OF AN INTERNAL COMBUSTION ENGINE

(75) Inventors: Andreas Strauss, Forchheim (DE); Andreas Röhr, Heroldsbach (DE); Jens Hoppe, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 452 days.

(21) Appl. No.: 11/183,723

(22) Filed: Jul. 18, 2005

(65) Prior Publication Data

US 2006/0016495 A1   Jan. 26, 2006

(30) Foreign Application Priority Data

Jul. 24, 2004  (DE)  ........................ 10 2004 036 096

(51) Int. Cl.
*F01L 1/34* (2006.01)
(52) U.S. Cl. ............ 123/90.17; 123/90.31; 137/625.64; 137/625.65
(58) Field of Classification Search ............ 123/90.17, 123/90.15, 90.31; 137/625.64, 625.65
See application file for complete search history.

(56) References Cited

U.S. PATENT DOCUMENTS

| | | | | |
|---|---|---|---|---|
| 5,062,454 A | * | 11/1991 | Ichihashi et al. | ....... 137/625.61 |
| 6,382,148 B1 | | 5/2002 | Maeyama et al. | |
| 2002/0026914 A1 | * | 3/2002 | Maeyama et al. | ........ 123/90.15 |

FOREIGN PATENT DOCUMENTS

| | | |
|---|---|---|
| DE | 10027080 | 3/2001 |
| DE | 10232528 | 7/2004 |
| JP | 2001317323 | 11/2001 |

* cited by examiner

*Primary Examiner*—Zelalem Eshete
(74) *Attorney, Agent, or Firm*—Volpe and Koenig, P.C.

(57) ABSTRACT

A control valve (18) for a device (1) to modify the timing of an internal combustion engine is provided. Here, a controlled rotation of the camshaft in reference to the crankshaft can be achieved via a hydraulic adjustment drive. A control valve (18) with operative connectors (A, B), a hydraulic connector (P), and at least one reservoir connector (T, $T_1$, $T_2$) controls the inflow of hydraulic fluid into and/or the outflow of hydraulic fluid out of the hydraulic adjustment drive. A filter (46) is arranged between the hydraulic connector (P) and the operative connectors (A, B).

5 Claims, 4 Drawing Sheets

CONTROL VALVE FOR A DEVICE TO MODIFY THE TIMING OF AN INTERNAL COMBUSTION ENGINE

FIELD OF THE INVENTION

The invention relates to a control valve for a device to modify the timing of an internal combustion engine having a valve housing, provided essentially in a hollow-cylindrical shape, a control piston arranged inside said valve housing and axially shiftable, a connector for hydraulic fluid, two operative connectors, and at least one reservoir connector, and the operative connector can be connected to the connector for the hydraulic fluid and the reservoir connector by way of an axial displacement of the control piston within the valve housing, and a filter.

In internal combustion engines camshafts are used in order to operate gas exchange valves. Camshafts are arranged in the internal combustion engine such that the cams mounted thereon contact cam followers, for example cup tappets, rocker arms, or finger levers. When a camshaft is being rotated, the cams roll over the cam followers, which again activate gas exchange valves. Therefore, position and shape of the cams determine both the opening duration as well as the opening amplitude and the opening and closing time of the gas exchange valves.

Modern engine concepts tend to design the valve drive in a variable manner. On the one hand, valve lift and valve opening duration are to be designed variable, up to the complete cutoff of individual cylinders. For this purpose, concepts are provided, such as the switchable cam followers or electro-hydraulic or electric valve activators. Furthermore, it has proven advantageous to allow access to the opening and closing times of the gas exchange valves during the operation of an internal combustion engine. Here, it is particularly desirable to have separate adjustments to the opening and closing time of the intake and/or exhaust valves, in order to specifically adjust a defined valve overlap, for example. By adjusting the opening and/or closing times of the gas exchange valves depending on the actual ignition map of the motor, for example the actual rotation and/or the actual load, the specific fuel consumption can be reduced, the exhaust behavior can be influenced in a positive manner, the motor efficiency can be increased, as well as the maximum torque and the maximum power.

The variability of the timing of the gas exchange valves described is achieved by way of a relative change of the phase position of the camshaft in reference to the crankshaft. Here, the camshaft is usually in a driving connection with the crankshaft via a chain, belt, toothed belt, or similarly operating driving means. A device for modifying the control times of an internal combustion engine, in the following also called camshaft adjuster, is mounted between the chain, belt, or toothed belt drive, driven by the crankshaft, and the camshaft, which device transfers the torque from the camshaft to the crankshaft. Here, the device is provided such that during the operation of the internal combustion engine the phase position of the camshaft in reference to the crankshaft is securely maintained, and, when desired, the camshaft can be rotated in reference to the crankshaft within a certain range of angles.

Internal combustion engines, having one camshaft each for the intake and the exhaust valves, can be provided with one camshaft adjuster for each of them. This allows the opening and closing times of the intake and exhaust gas exchange valves to be temporarily offset in reference to one another and to specifically adjust the valve overlap.

Modern camshaft adjusters are usually positioned at the driving end of the camshaft. However, the camshaft adjuster may also be allocated at an intermediate shaft, a stationary component, or the crankshaft. It comprises a driving wheel, driven by the crankshaft and maintaining a fixed phase relation to said driving wheel, a driven component connected in a driving manner to said camshaft, and an adjustment mechanism transferring the torque from the driving wheel to the driven component. In the case of a camshaft adjuster arranged apart from the crankshaft, the driving wheel may be embodied as a chain wheel, a belted wheel, or a toothed wheel and be driven by the crankshaft via a chained, belted, or toothed wheel drive. The adjustment mechanism may be operated by electric, hydraulic or pneumatic power.

So-called axial piston adjusters and rotary piston adjusters are two preferred embodiments of hydraulically adjusted camshaft adjusters.

In the axial piston adjusters the driving wheel is connected to one piston and the piston is connected to the drive component, each using lateral toothed wheel works. The piston divides a hollow space, formed by the power take-off part and the driving wheel, into two pressure chambers arranged axially in reference to one another. When one pressure chamber is acted on by a hydraulic fluid, with the other pressure chamber being connected to a reservoir, the piston is displaced in the axial direction. The axial shifting of the piston is transferred into a relative torsion of the driving wheel in reference to the power take-off part via the lateral toothed connection and, thus the camshaft in reference to the crankshaft.

The so-called rotary piston adjuster is a second embodiment of a hydraulic camshaft adjuster. Here, the driving wheel is connected to a stator in a torque-proof manner. The stator and a rotor are arranged concentrically in reference to one another, with the rotor being connected in a friction-locked, form-fitting, or substance bonding manner, for example by way of a tight fit, a screwed or welded connection, to a camshaft, an extension of the camshaft, or an intermediate shaft. Several hollow spaces, spaced apart from one another in the circumferential direction, are formed in the stator, extending from the rotor radially outward. In the axial direction, the hollow spaces are limited by side covers in a pressure-tight manner. A vane connected to the rotor extends into each of these hollow spaces, dividing each hollow space into two pressure chambers. By way of a targeted connection of the individual pressure chambers via a hydraulic pump and/or a hydraulic fluid outlet the phase of the camshaft in reference to the crankshaft can be adjusted and/or maintained.

Sensors collect the characteristics of the motor for controlling the camshaft adjuster, such as, for example, the load condition and the rotation. This data is forwarded to an electronic control device, controlling the inflow and the outflow of the hydraulic fluid in the various pressure chambers after having compared the data with a chart of characteristics of the internal combustion engine.

In order to adjust the phase position of the camshaft in reference to the crankshaft in hydraulic camshaft adjusters, one of the two pressure chambers of a hollow space, operating opposite to one another, is connected to the reservoir via a hydraulic pump. The inflow of the hydraulic fluid into one chamber in connection with the outflow of hydraulic fluid from the other chamber shifts the pistons, separating the pressure chambers in the axial direction, thus rotating the camshaft in reference to the crankshaft via laterally toothed gears in the axial piston adjusters. In rotary piston adjusters, the pressurization of one chamber and the pressure release of the other chamber causes a shifting of the vane and, thus, directly rotates the camshaft in reference to the crankshaft. In order to maintain the phase position, both pressure chambers are either connected via the hydraulic pump or separated both from the hydraulic pump and from the reservoir.

The control of the flow of the hydraulic fluid into and/or out of the pressure chambers occurs by way of a control valve, usually a 4/3 proportional valve. A valve housing is provided with one connection for the pressure chambers each (operative connector), one connection to the hydraulic pump, and at least one connection to a reservoir. A control piston, which can be shifted in the axial direction, is provided inside the valve housing essentially provided in a cylindrical form. The control piston can be axially positioned by way of an electromagnetic adjustment member against the force of a spring element into any position between two defined end positions. Furthermore, the control piston is provided with circular grooves and control edges, by which the individual pressure chambers can be connected optionally to the hydraulic pump or the reservoir. A position of the control piston can also be provided, in which the pressure chambers are separated both from the hydraulic pump as well as from the reservoir of the hydraulic fluid.

Contaminants may be present in the hydraulic circuit, which can be carried into the valve by the hydraulic fluid. Such contaminants can develop during the processing of the motor block or by wear during the operation of the internal combustion engine. If these particles enter the control valve, the danger arises that they can damage the control edges of the valve or lead to a jamming of the control piston inside the valve housing. As a result, the phase position of the camshaft in reference to the crankshaft can no longer be changed, which has negative effects on the fuel consumption, the performance, the torque, or the exhaust behavior of the internal combustion engine.

Devices to change the timing are known, in which the entry of contaminants into a proportional hydraulic valve is prevented by filters for hydraulic fluids being mounted between the hydraulic pump and the hydraulic connector. For example, U.S. Pat. No. 6,382,148 B1 shows a circularly embodied oil filter, which is arranged in a circular groove of the valve housing, with the bottom of the circular groove being provided with openings, corresponding to the P-connection of the valve. The circularly embodied filter for hydraulic fluids is provided with an axially extending interruption in one location, resulting in two circumferential ends of the filter for hydraulic fluids facing one another. The circumferential ends of the filter for hydraulic fluids are provided with means for a fastening in a form-fitting manner. During assembly the open filter is inserted into the circular groove and the circumferentially open ends are connected to one another with the help of form-fitting means.

This embodiment has the disadvantage of a great expense during the assembly of the filter at the valve housing. The filter is inserted into the circular groove, and subsequently the form-fitting means are made to engage the circular groove.

If there is any faulty assembly of the filter, there is the danger during the mounting process of the camshaft into the valve housing that the filter tilts between the control valve and the valve housing and becomes damaged or even sheared off. Furthermore, the seal of the filter of the hydraulic fluids may open due to an improper assembly or due to the forces present during operation. This again results in contaminants being able to enter past the filter, causing the above-mentioned problems.

SUMMARY

Therefore, the invention in based on the object to avoid said above-mentioned disadvantages and thus to provide a hydraulic control valve, provided with a filter, which protects the control edges of the operative connectors from contaminants, improving the processing safety of the filter assembly, and ensuring the long term function of the filter.

This object is attained according to the invention in that the filter is arranged between the hydraulic connector and the operative connectors. The control piston is advantageously provided in a hollow fashion, the interior of the control piston communicates, depending on its position, with one of the operative connector, and the filter is provided on the interior of the control piston. The invention is based on the concept to arrange the filter within the valve and, in particular, within the control piston of the valve, which is formed in a hollow fashion. The filter is provided such that it is kept in its position in a force-fitting manner or via form-fitting means. By the arrangement of the filter within the control piston, no forces act upon it during the assembly of the control valve into the valve housing. Thus, potential damage is prevented.

Within the control piston, axial stops may be provided, which allow a process-secured positioning of the filter during the assembly process. Alternatively, the filter may also be pressed in the guide paths.

In an advantageous embodiment of the invention, the interior of the piston communicates, independently of its position, with the hydraulic connector via two openings in the outer surface of the control piston, the filter being provided in the form of a cylindrical outer surface and arranged in the area of the second openings.

In this embodiment several circular grooves, axially spaced apart from one another, are formed at the outer surface of the essentially cylindrically formed valve housing. The bottoms of the grooves are provided with a multitude of openings, thus each circular groove forms a connection to the valve. Within the valve housing, a control piston is mounted, also provided that is essentially cylindrical, which can be displaced axially via an adjustment mechanism within the valve housing. The exterior surface of the control piston is also provided with several axially spaced apart circular grooves, with one of the circular grooves being embodied such that it communicates at each position of the control piston within the valve housing with the circular groove of the valve housing, serving as a hydraulic connector. This circular groove of the control piston communicates via the openings inserted in the groove bases with the interior of the control piston, embodied in a hollow fashion. The hydraulic fluid can now flow via the hydraulic connector in the valve housing into the circular groove of the control piston and from there into its interior. The interior of the control piston is connected via additional openings to another circular groove in its exterior surface, with said circular groove communicating, depending on the axial position of the control piston within the valve housing, with a first or a second operative connector.

A cylindrically embodied filter for hydraulic fluids is arranged on the interior of the control piston in the area of the hydraulic connector. The axial ends of the filter are provided such that their circumferential surfaces contact the interior sleeve surface of the control piston in a pressure-tight manner. Advantageously, the filter is formed such that a force-fitting connection develops between the circumferential surfaces, its axial ends, and the interior sleeve surfaces of the control piston. Hydraulic fluid flowing in from the hydraulic connector enters the interior of the control piston via the filter web, thus contaminants are being retained. The filter is pressed into the guide paths in the interior of the control piston. By embodying an axial stop at the interior surface of the control piston, the filter can be positioned in a sure manner in the area of the hydraulic connector during the pressing-in process. Subsequently, a cup-shaped shell is pressed into the interior of the control piston. The cup-shaped shell seals the control piston, can be used as the contact point for a tappet of an adjustment mechanism, and additionally keeps the filter in its predetermined position.

The filter, provided without any seal, is inserted in its operational form into the control piston, and is kept in its position in a form-fitting or force-fitting manner. Any shifting or opening of the filter during operation, as described in the embodiments of prior art, is therefore excluded.

In an alternative embodiment, the control piston is provided in a hollow fashion, the interior of the control piston communicates via an axial opening with the hydraulic connector, the filter is embodied in a cup-shaped fashion, and inserted into the axial opening.

In this embodiment the hydraulic connector is arranged in the axial direction, while the operative connectors and the reservoir connectors are advantageously aligned in the radial direction. The hydraulic fluid enters the valve housing in the axial direction and impinges one of the two operative connectors depending on the axial position of the control piston within the valve housing. Simultaneously, the respective opposite operative connector is connected to the reservoir connector via a circular groove provided in the exterior surface of the control piston provided essentially in a hollow cylindrical form. It is suggested, according to the invention, to insert a filter for hydraulic fluids into the axial opening of the valve housing. The filter for hydraulic fluids is advantageously embodied in a cup-shaped manner, which enlarges the active filter surface. The face end of the cup-shaped filter is provided with a disc-shaped axial stop, which contacts the valve housing in the assembled state. Additionally, form-fitting means may be provided in order to fix the filter in the valve housing. This may be realized, for example, by way of a thread in the axial stop of the filter.

In this embodiment the filter is also provided without any seal, inserted into the control piston in its operational form, and is held in its position by form-fitting and/or force-fitting means. Any shifting or opening of the filter during operation, as described possible in the embodiments of prior art, is therefore excluded.

Furthermore, it is provided for the filter to include a frame and a filter web arranged between the components of the frame parts. Advantageously, a circular groove is provided between the filter web and the interior surface of the control piston. In addition to the contour accuracy of the filter, the use of a frame provides the advantage that it can be used for the form-fitting connection of the filter to the valve. Furthermore, by using the frame in the first embodiment, a circular groove can be formed between the openings in the control piston and the filter web, allowing the hydraulic fluid to flow around the filter and, thus, increasing the effective filter surface.

In another advantageous embodiment of the invention, a check valve is arranged between the filter and the operative connector. It is preferred for the check valve to comprise a spring-loaded stop member and a valve hub, with these components being located within a housing.

During the operation of the internal combustion engine, the hydraulic system of the camshaft adjuster is exposed to high pressure pulses based on the alternating moments of the camshaft. These pressure surges can lead to damages of the hydraulic pump or other components of the belt drive or the chain drive. In order to prevent the influx of such pressure surges into the hydraulic system of the internal combustion engine it is preferred to arrange a check valve between the operative connectors and the hydraulic connectors of the valve. This arrangement is particularly suitable for camshaft adjusters having a central valve, because this position of the check valve is provided with the least possible distance to the point of origin of the pressure pulses.

Locating the check valve inside the control valve increases the torsional stiffness of the adjuster and, thus the stability of its position.

In another advantageous embodiment of the invention the filter is arranged within the housing of a check valve. This embodiment is advantageous because during the assembly of the control valve only one component must be pressed into the control piston. The filter is held in the housing of the check valve, safe from getting lost.

BRIEF DESCRIPTION OF THE DRAWINGS

Additional features of the invention will be understood from the following description and from the drawings, in which the exemplary embodiments of the invention are shown in a simplified manner. Shown are.

DETAILED DESCRIPTION OF THE PREFERRED EMBODIMENTS

Figure 1:
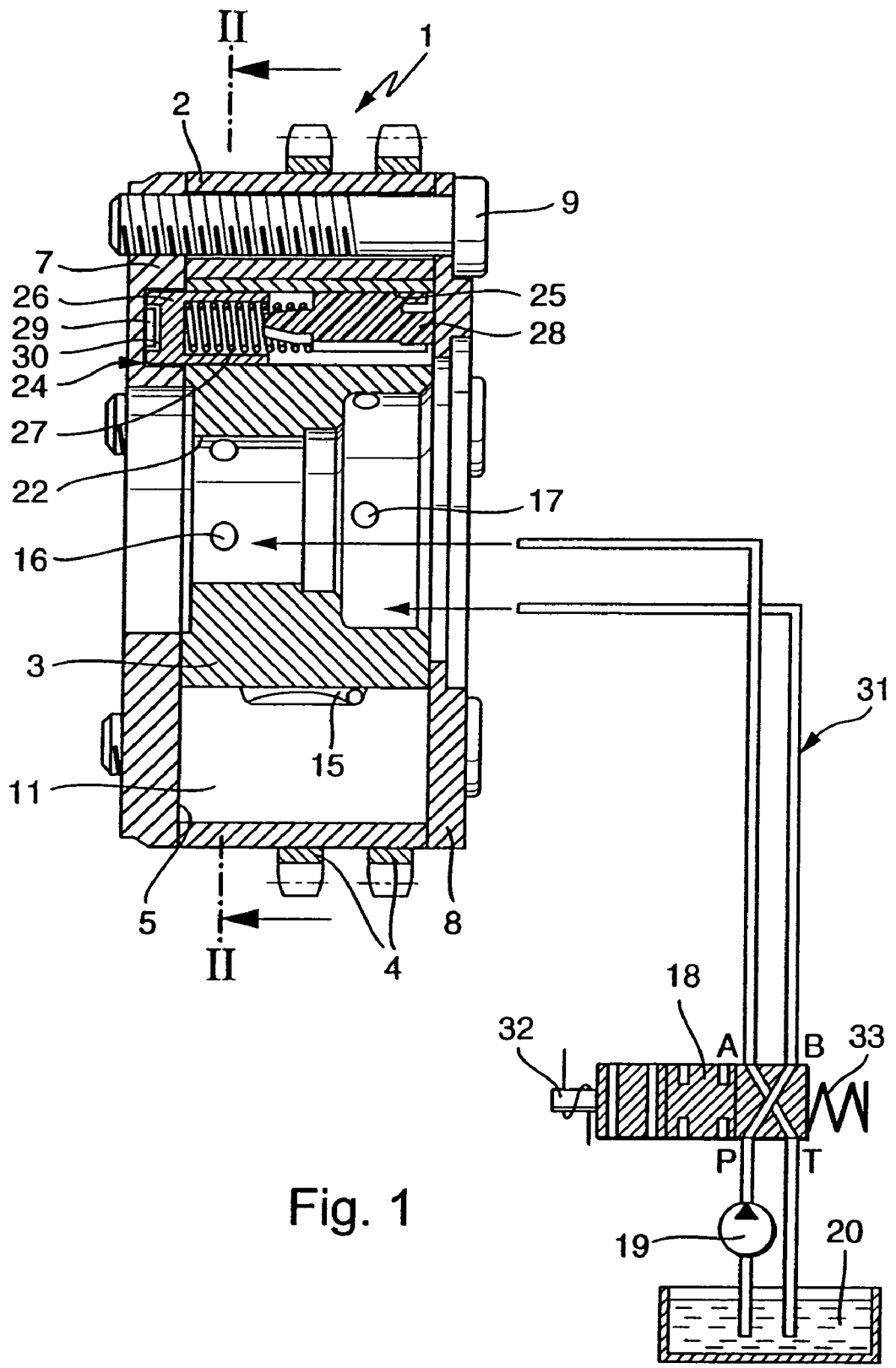
FIG. 1 is a longitudinal cross-section through a device for modifying the timing of an internal combustion engine having a hydraulic circuit.
Figure 2:
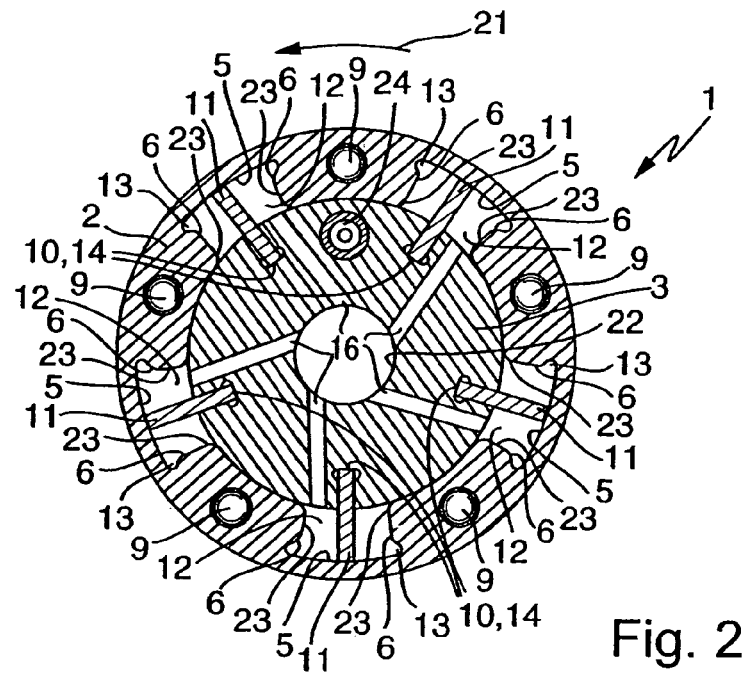
FIG. 2 is a cross-section through the device shown in FIG. 1 along a line II-II.

FIGS. 1 and 2 show a device 1 for modifying the timing of an internal combustion engine. The device 1 essentially comprises a stator 2 and a rotor 3, concentrically arranged thereto. A drive wheel 4 is connected in a torque-proof manner to the stator 2 and provided as a chain wheel in the embodiment shown. Embodiments of the drive wheel 4 in the form of belted wheels or toothed wheels are possible as well. In the embodiment shown, the stator 2 is pivotally supported on the rotor 3, with five recesses 5 being provided at the interior surface of the stator 2 in the circumferential direction. The recesses 5 are limited in the radial direction by the stator 2 and the rotor 3, in the circumferential direction by two side walls 6 of the stator 2, and in the axial direction by a first and a second side cover plate 7, 8. Each of the recesses 5 is sealed in a pressure-proof manner. The first and the second side cover plate 7, 8 are connected to the stator 2 by way of connecting elements 9, for example screws.

At the exterior surface of the rotor 3, axially extending vane grooves 10 are provided, with a vane 11 extending radially being allocated to each vane groove 10. One vane 11 extends in each recess 5, with the vane 11 contacting the stator 2 in the radial direction and the side cover plate 7, 8 in the axial direction. Each vane 11 divides a recess 5 into two pressure chambers 12, 13, operating opposite to one another. In order to ensure a pressure-proof contact of the vane 11 to the stator 2, leaf springs 15 are mounted between the groove bases 14 of the vane grooves 10 and the vanes 10, impinging the vane 11 with a force in the radial direction.

The first and the second pressure chambers 12, 13 can be connected via a control valve 18 to a hydraulic pump 19 or a reservoir 20 by way of first and second hydraulic lines 16, 17. This forms a control drive, which allows a relative rotation of the stator 2 in reference to the rotor 3. Here, it is provided for either all first pressure chambers 12 to be connected to the hydraulic pump 19 and all second pressure chambers 13 to the reservoir 20 and/or the exact opposite configuration. If the first pressure chambers 12 are connected to the hydraulic pump 19 and the second pressure chambers 13 to the reservoir 20, the first pressure chambers 12 expand at the expense of the second pressure chambers 13. This results in a displacement of the vanes 11 in the circumferential direction, in the direction indicated by the arrow 21. The rotor 3 is rotated in reference to the stator 2 by the displacement of the vanes 11.

In the embodiment shown, the stator 2 is driven by the crankshaft via a chain drive, not shown, engaging its drive wheel 4. The drive of the stator 2 by way of a belt drive or a toothed drive is also possible. The rotor 3 is connected to a camshaft, not shown, in a force-fitting, form-fitting, or substance engaging manner, for example via tight fit or by a screwed connection via a central screw. From the relative torsion of the rotor 3 in reference to the stator 2, a phase shift results of the camshaft in reference to the crankshaft, as a result of the influx and/or draining of the hydraulic fluid into and/or out of the pressure chambers 12, 13. By way of a targeted injection and/or draining of hydraulic fluid into the pressure chambers 12, 13 the timing of the gas exchange valves of the internal combustion engine can be varied in a controlled fashion.

In the embodiment shown, the hydraulic passages 16, 17 are essentially provided as radially arranged bores, extending from a central bore 22 of the rotor 3 to its exterior surface. Within the central bore 22, a central valve, not shown, may be arranged, by which the pressure chambers 12, 13 can be connected to the hydraulic pump 19 and/or the reservoir 20 in a controlled fashion. Another possibility is to arrange a hydraulic distributor within the central bore 22, which connects the hydraulic pipes 16, 17 via hydraulic channels and circular grooves to the connectors of an externally mounted control valve 18.

The side walls 6 of the recesses 5, essentially extending radially, are provided with projections 23, which extend into the recesses 5 in the circumferential direction. The projections 23 serve as a stop for the vanes 11 and ensure that the pressure chambers 12, 13 can be supplied with hydraulic fluid, even when the rotor 3 is in an extreme position in reference to the stator 2, in which the vanes 11 contact one of the side walls 6.

In the event of insufficient supply with hydraulic fluid to the device 1, for example during the start-up phase of the internal combustion engine, the rotor 3 is moved in reference to the stator 2 in an uncontrolled manner by the interacting moment and the drag moment, which is caused by the camshaft. In a first phase, the drag torque of the camshaft presses the rotor in the circumferential direction in reference to the rotor, which is contrary to the rotational direction of the stator, until said rotor contacts the side walls 6. Following this, the alternating moments of the camshaft bear on the rotor 3 leading to a swaying back and forth of the rotor 3 and, thus the vanes 11 inside the recesses 5, until at least one of the pressure chambers 12, 13 is filled completely with hydraulic fluid. This leads to an increased wear and to noise development in the device 1. In order to prevent that, a locking element 24 is provided in the device 1. For this purpose, a cup-shaped piston 26 is arranged in an axial bore 25 of the rotor 3, which is acted on with a force in the axial direction by a spring 27. The spring 27 rests in the axial direction, on one side, on a ventilation element 28, and is arranged inside the piston 26 with its axial end facing away therefrom, embodied in a cup-shaped fashion. In the first side cover 7, a crank 29 is provided such that the rotor 3 can be locked in a position in reference to the stator 2, equivalent to the position during the start of the internal combustion engine. In this position, in the event of insufficient supply with hydraulic fluid, the piston 26 is pressed into the crank 29 by way of a spring 27. Furthermore, in the event of a sufficient supply of hydraulic fluid to the device 1, means are provided to press the piston 26 into the axial bore 25, and thus to override the lock. This is usually achieved by way of a hydraulic fluid, which is inserted into a recess 30 via hydraulic fluid lines, not shown, which are embodied at the lid-side face end of the piston 26. In order to remove leaking oil from the spring chamber of the axial bore 25, the ventilation element 28 is provided with axially extending grooves, along which the hydraulic fluid can be guided to a bore in the second side cover plate 8.

In FIG. 1, the hydraulic fluid circuit 31 is shown as well. From a reservoir 20, a hydraulic connector P of a control valve 18 is supplied with hydraulic fluid from a reservoir 20 by a hydraulic fluid pump 19. Simultaneously, hydraulic fluid is guided from the control valve 18 into the reservoir 20 via a reservoir connector T. The control valve 18 also is provided with operating connectors A, B. By means of an electromagnetic adjustment member 32, which acts against the spring force of a first spring element 33, the control valve 18 can be brought into three positions. In a first position of the control valve 18, which is equivalent to a condition of the adjustment member 32 without power supply, the operative connector A is connected to the reservoir connector T and the hydraulic connector P to the operative connector B and, thus to the two pressure chambers 13. In a medium position, both the operative connector A as well as the operative connector B are separated both from the hydraulic connector P as well as from the reservoir connector T. In a third position of the control valve 18, the hydraulic connector P is connected to the operative connector A and, thus, to the first pressure chamber 12, while the second pressure chamber 13 is connected to the reservoir connector T via an operative connector B.

Figure 3:
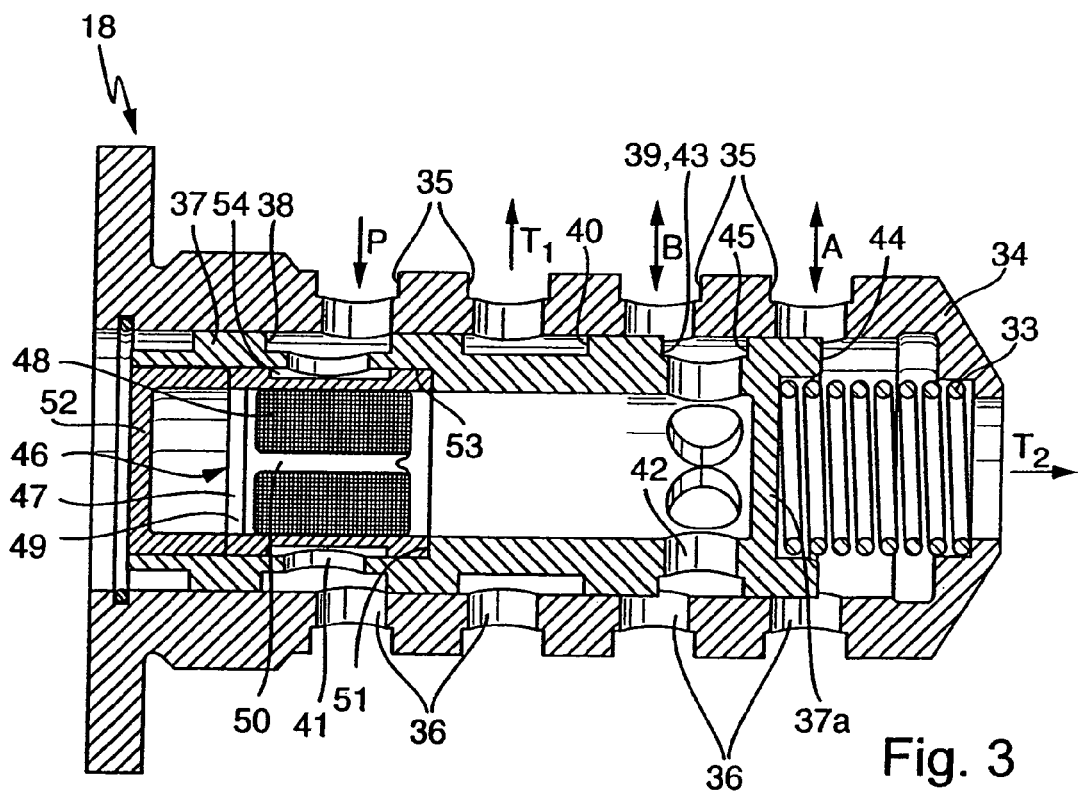
FIG. 3 is a longitudinal cross-section through a control valve according to the invention.

A control valve 18 according to the invention is shown in a longitudinal cross-section in FIG. 3. The valve housing 34, essentially provided in a hollow-cylindrical fashion, is provided with a radial hydraulic connector P, a radial reservoir connector $T_1$, two operative connectors A, B, and an axial reservoir connector $T_2$. The radial connectors $P_1 T_1$, A, B are embodied as first circular grooves 35, spaced from one another and extending around the exterior surface of the valve housing 34. The first circular grooves 35 are provided with several first openings 36, which open into the interior of the valve housing 34.

Within the valve housing 34 a control piston 37 is arranged, axially displaceable and provided in an essentially hollow-cylindrical fashion. An axial end of the control piston is closed in a pressure-tight manner by way of a wall section 37a. The wall section 37a can be formed in one piece with the control piston or separately therefrom. By way of a control member 32, not shown, the control piston 37 can be positioned and held arbitrarily against the spring force of a first spring element 33 within two extreme values.

The exterior surface of the control piston 37 is provided with a second, a third, and a fourth circular groove 38, 39, 40. The second and the third circular groove 38, 39 communicate via the second and third openings 41, 42, with the interior of the control valve 37. The second circular groove 38 is formed such that it communicates with the first openings 36 of a first circular groove 35 of the hydraulic connector P in each position of the control valve 37 in reference to the valve housing 34.

During the operation of the internal combustion engine, the hydraulic fluid enters the interior of the control piston 37 from the hydraulic connector P via the second circular groove 38 and the second openings 41. In the first position of the control piston 37 shown in FIG. 3 the hydraulic fluid reaches the operative connector B via the third openings 42 and the third circular groove 39. By acting on the second pressure chambers 13 with hydraulic fluid, via the operative connector B, hydraulic fluid is removed from the first pressure chambers 12 towards the operative connector A and reaches the axially arranged reservoir connector $T_2$ via its first openings 36.

If the electromagnetic adjustment member 32 is supplied with energy, the control piston 37 is displaced against the spring force of the first spring element 33. As a result, the covering of the first openings 36 of the operative connector B by a first control edge 43 of the third circular groove 39 increases. Additionally, the covering of the first openings 36 of the operative connector A by the second control edge 44 of the control piston 37 increases. When the control piston 37 reaches a central position, not shown, the operative connector A is no longer connected to the axial reservoir connector $T_2$ by way of the complete covering of the second control edge 44. Furthermore, neither the operative connector A nor the operative connector B communicate with the third circular groove 39.

Alternatively, the control piston 37 may be embodied such that it communicates with the third circular groove 39 in the central position of the two operative connectors A, B.

When the control piston 37 is displaced further against the spring force of the first spring element 33, a third control edge 45 opens the first openings 36 of the operative connector A towards the third circular groove 39. Now, hydraulic fluid flowing in from the hydraulic connector P reaches exclusively the operative connector A. Simultaneously, the fourth circular groove 40 communicates both with the operative connector B as well as the radial reservoir connector $T_1$. This way, hydraulic fluid flows from the hydraulic pump 19 into the first pressure chambers 12, which leads to a relative rotation of the rotor 3 in reference to the stator 2. The hydraulic fluid displaced from the second pressure chambers 13 reaches the radial reservoir connector $T_1$ via the operative connector B and the fourth circular groove 40. The third control edge 45 and the fourth circular groove 40 may be provided such that during the displacement of the control piston 37, first the operative connector A is connected to the hydraulic pump 19 and then the operative connector B to the reservoir 20. Alternatively, both connections may be made simultaneously.

An essentially cylindrically embodied filter 46 is arranged within the control piston 37. The filter 46 comprises a frame 47, preferably made from plastic, and at least one filter section 48. The filter section 48 preferably comprises a web made from plastic or metal, with the frame 47 being connected to the filter sections 48 in a non-detachable manner. The frame 47 is provided with an essentially circular section 49 at each axial end of the filter 46, with the circular section 49 being connected to one another via several lateral rods 50. By way of a circular section 49, the filter 46 is fixed in a force-fitting manner inside the control piston 37. Here, it is advantageous to provide an axial stop 51 within the control piston 37, which serves as a path limitation during the pressing in of the filter 46 into the control piston 37. Alternatively, the filter 46 can be guided during pressing in.

The filter 46 is provided in the area of the second openings 41 and covers them completely. At one axial end of the filter 46, it contacts the axial stop 51. The other axial end rests on a cup-shaped shell 52, which is fixed in a force-fitting manner on the inside of the control piston 37. This ensures that the filter 46 maintains its position during the operation of the internal combustion engine. Furthermore, the shell 52 seals the control piston 37 in the axial direction and can serve as a contact point for a push rod of the adjustment member 32, not shown.

In the radial direction, the circular segments 49 of the filter 46 are connected to the interior surface 53 of the control piston 37 in a pressure-tight manner, while a gap 54 is provided between the longitudinal rods 50 and the interior sleeve surface 53.

Hydraulic fluid flowing in from the hydraulic connector P via the second opening 41 reaches a circular groove, encircling the filter 46, provided between the filter sections 48 and the interior sleeve surface 53. The hydraulic fluid enters the interior of the control piston 37 via the filter sections 48, which effectively keeps any contaminants potentially present in the hydraulic fluid away from the control edges 43, 44, 45.

Figure 4:
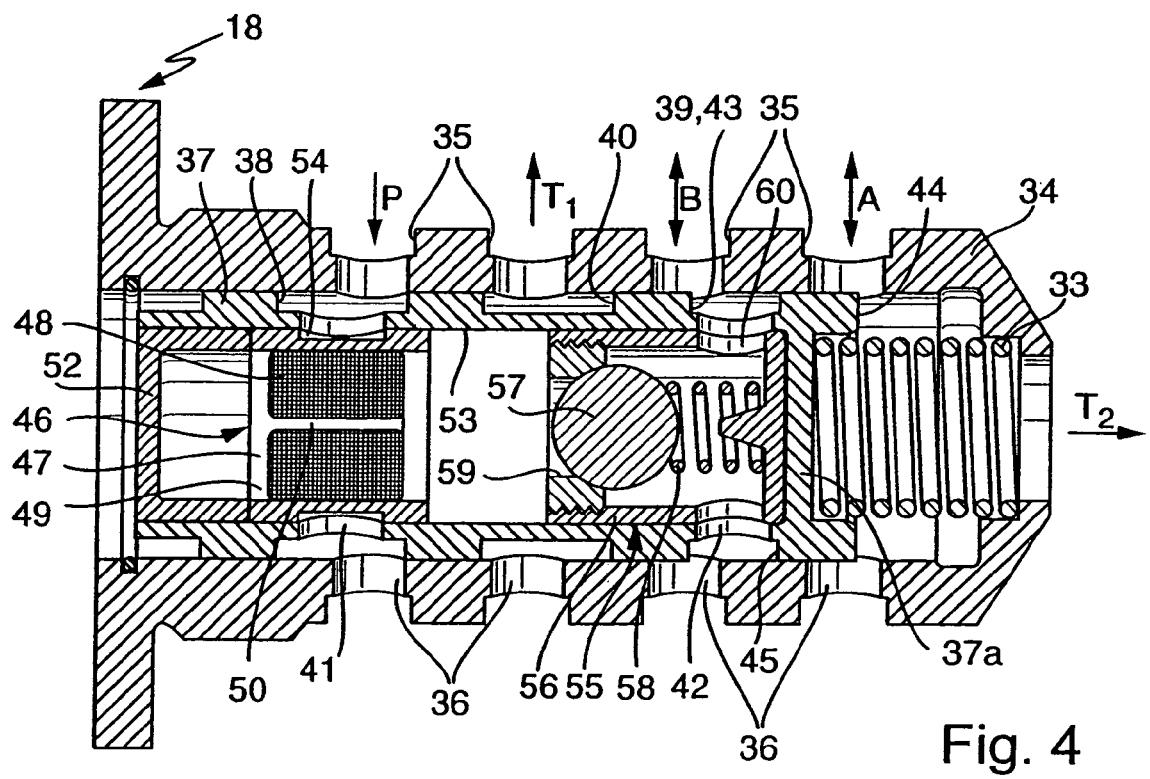
FIG. 4 is a longitudinal cross-section through a second embodiment of a control valve according to the invention.

Another embodiment of the control valve 18 according to the invention is shown in FIG. 4. The form and function of this variant is almost identical to the first embodiment. Here, the difference to the first embodiment is that no axial stop 51 is provided in the interior surface 53 of the control piston 37. The filter 46 is guided and pressed into the control piston 37 during the assembly of the control valve 18. In this embodiment, a check valve 55 is arranged between the filter 46 and the operative connectors A, B. It comprises a housing 56, which is arranged inside of the control piston 37 in a force-fitting manner. A stop member 57 is provided within the housing 56, which is pressed into a hub 59 of the check valve 55 by way of a second spring element 58. Instead of the ball check valve shown here, other embodiments, such as plate check valves may be used as well.

Hydraulic fluid flowing into the control valve 18 reaches the check valve 55 after passing through the filter 46. By arranging the filter 46 directly behind the hydraulic connector P, the control edges 43, 44, 45, and the check valve 55 are effectively protected from any damage by contaminants. Beyond a certain pressure within the control piston 37, the stop member 57 is displaced against the spring force of the second spring element 58, and the hydraulic fluid can reach the operative connectors A, B via the fourth openings 60 and the third openings 42 provided in the housing 56.

During the operation of the internal combustion engine, due to the alternating moments of the camshaft, pressure pulses are generated within the device 1. Here, pressure surges occur, which are transferred into the hydraulic system and can damage other consumer loads. The arrangement of a check valve 55 between the pressure chambers 12, 13 and the hydraulic fluid connector P prevents a transfer of these pressure surges into the hydraulic system. This protects both the hydraulic pump 19 as well as additional consumers connected to this hydraulic circuit. Advantageously, this embodiment is provided with a check valve 55 arranged within the control piston 37 and, thus requiring no additional space. Another advantage is the fact that, particularly when the control valve 18 is used as the central valve, the distance between the place, at which the pressure pulses develop, and the check valve 55 is minimal. Pressure fluctuations are practically compensated at their place of origination.

Figure 5:
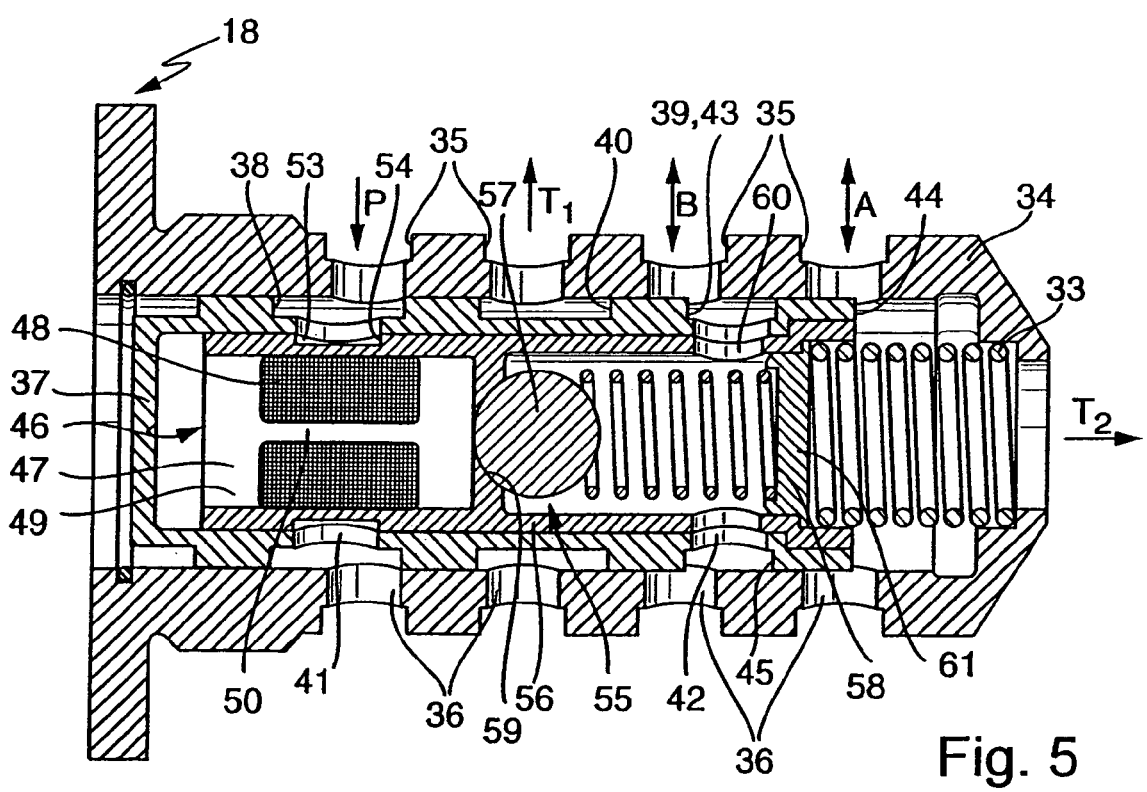
FIG. 5 is a longitudinal cross-section through a third embodiment of a control valve according to the invention.

In FIG. 5, another embodiment of the control valve 18 according to the invention is shown. The form and function of this control valve 18 is almost identical to the variant shown in FIG. 4. In this embodiment, the filter 46 is arranged advantageously inside the housing 56 of the check valve 55. The housing 56 may be provided as a cost-effectively shaped plastic part. By integrating the filter 46 into the housing 56 of the check valve 55 the assembly expense for mounting the control valve 18 is reduced considerably. Only one component remains to be positioned and mounted within the control piston 37.

In this embodiment, the face end of the control piston 37, facing away from the reservoir connector $T_2$, is provided in a closed version. The housing 56 is provided with a H-shaped cross-section, with the filter 46 being arranged in one chamber of the H and the stop member 57 with the second spring element 58 being arranged in the other chamber of the stop member 57. The second spring element 58 rests on a seal 61. The radially extending part of the housing 56 is provided with an opening adjusted to the stop member 57 and serving as a hub 59.

Figure 6:
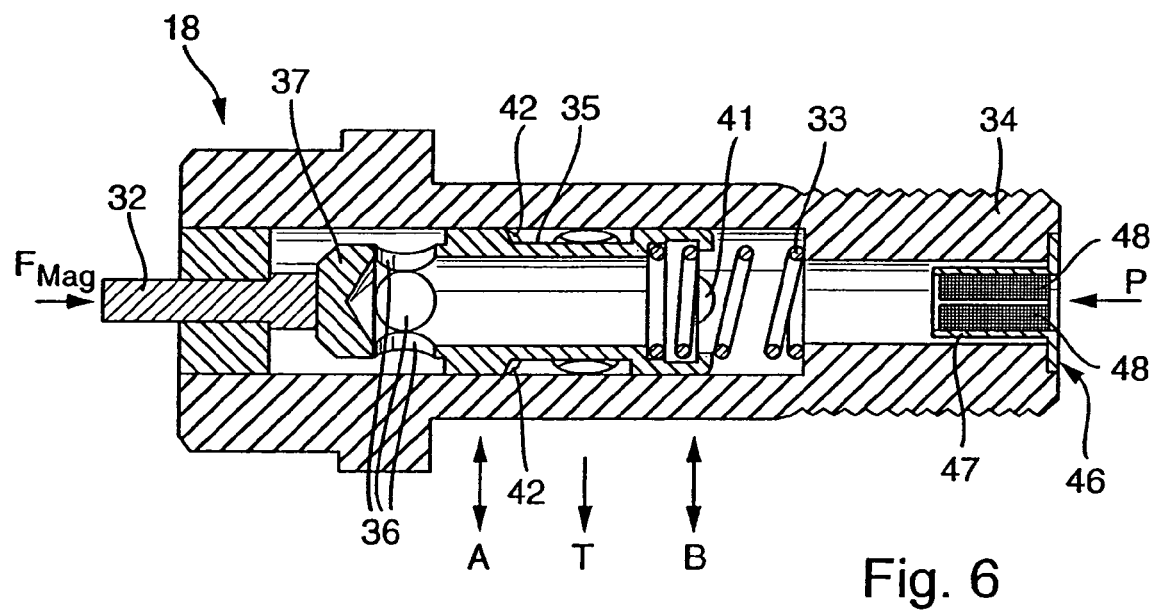
FIG. 6 is a longitudinal cross-section through a third embodiment of a control valve according to the invention.

FIG. 6 shows a fourth variant of the control valve 18 according to the invention, in which a control piston 37, axially displaceable, is arranged within a valve housing 34, essentially formed in a hollow-cylindrical shape. The control piston 37 is also provided essentially in a hollow-cylindrical shape, with its face directed towards the axially aligned hydraulic connector P being open. The exterior surface of the control piston 37 is provided with a first circular groove 35 and a group of first openings 36.

During the operation of the internal combustion engine, the hydraulic fluid enters the interior of the valve housing 34 via an axially aligned hydraulic connector P. Depending on the position of the control piston 37 within the valve housing 34, the hydraulic fluid either enters the operative connector B via the second openings 41 or the operative connector A via the third openings 42. Simultaneously, the operative connectors A, B, each of them not impinged with hydraulic fluid, are connected to the reservoir connector T via a first circular groove 35.

According to the invention, a filter 46 is arranged between the hydraulic connector P and the operative connectors A, B. The filter 46 is formed in a cup-shaped manner and comprises a frame 47 and filter sections 48. At the side facing the hydraulic connector P, the frame 47 is provided with a collar, extending radially, and serving as an axial stop of the filter 46. Furthermore, it is possible to fasten the filter 46 at the valve housing 34 in a form-fitting, force-fitting, or substance bonding manner. Similar to the above-described embodiments, here too, a check valve 55 may be provided between the hydraulic connector P and the operative connectors A, B.

LIST OF REFERENCE CHARACTERS

1 Device
2 Stator
3 Rotor
4 Driving wheel
5 Recesses
6 Side wall
7 First side cover plate
8 Second side cover plate
9 connection element
10 Groove for vane
11 Vane
12 First pressure chamber
13 Second pressure chamber
14 Groove base
15 Vane spring element
16 First hydraulic line
17 Second hydraulic line
18 Control valve
19 Hydraulic pump
20 Reservoir
21 Arrow
22 Central bore
23 Projection
24 Locking element
25 Axial bore
26 Piston
27 Spring
28 Ventilation element
29 Crank
30 Clearance
31 Hydraulic circuit
32 Adjustment member
33 First spring element
34 Valve housing
35 First circular groove
36 First openings
37 Control piston
37a Wall section
38 Second circular groove
39 Third circular groove
40 Fourth circular groove
41 Second opening
42 Third opening
43 First control edge
44 Second control edge
45 Third control edge
46 Filter
47 Frame
48 Filter section
49 Segment
50 Longitudinal bars
51 Axial stop
52 Shell
53 Sleeve surface
54 Gap
55 Check valve
56 Housing
57 Stop member
58 Second spring element
59 Hub
60 Fourth opening
61 Seal
P Hydraulic connector
T Reservoir connector
$T_1$ Radial reservoir connector
$T_2$ Axial reservoir connector
A First operative connector
B Second operative connector

The invention claimed is:

1. A control valve for a device to modify the timing of an internal combustion engine, comprising
a valve housing having a generally hollow-cylindrical shape,
a control piston arranged inside the valve housing and axially displaceable therein,
a hydraulic connector on the housing,
two operative connectors on the housing, at least one reservoir connector on the housing, with the operative connectors being connectable to the hydraulic connector and the reservoir connector by way of an axial displacement of the control piston inside the valve housing, and a filter arranged between the hydraulic connector and the operative connectors, wherein the control piston is hollow with an interior thereof communicating with one of the operative connectors depending on a position of the piston and communicating with the hydraulic connector via two openings in an outer surface of the control piston independently from a position of the piston, and the filter is arranged inside the control piston and has a cylindrical surface arranged in an area of the two openings.

2. A control valve according to claim 1, wherein a circular groove is located between the filter section and the interior surface of the control piston.

3. A control valve according to claim 1, wherein a check valve is arranged between the filter and the operative connectors.

4. A control valve according to claim 3, wherein the check valve comprises a spring-loaded stop member and a hub arranged within a housing.

5. A control valve according to claim 4, wherein the filter is arranged inside the housing of the check valve.

* * * * *